3,637,743
PRODUCTION OF 2-PYRROLIDONES
Frank R. Prince, Los Angeles, Calif., assignor to Atlantic Richfield Company, Philadelphia, Pa.
No Drawing. Filed Aug. 28, 1968, Ser. No. 755,813
Int. Cl. C07d 27/08
U.S. Cl. 260—326.5 FN     6 Claims

ABSTRACT OF THE DISCLOSURE 2-pyrrolidone ($\gamma$-butyrolactam) and N-substituted-2-pyrrolidones are produced in one step by the carbonylation of allyl chloride in the presence of ammonia in a two-phase solvent system, e.g., benzene and water.

BACKGROUND OF THE INVENTION

This invention relates generally to an improved process for producing 2-pyrrolidones. More particularly, this invention relates to a simplified and improved process for producing 2 - pyrrolidone ($\gamma$ - butyrolactam-2-oxopyrrolidene) and N-substituted-2-pyrrolidones in improved and controllable yield in a one step process using a two-phase solvent system.

2-pyrrolidone has been prepared by the amminolysis of $\gamma$-butyrolactone as described in U.S. Pat. No. 3,133,085; by the carbonylation of allylamine, as described in Belgian Pat. No. 660,797 and British Pat. No. 628,659; by the amminolysis of $\omega$-halo fatty acids, described in German Pat. No. 935,485; from $\gamma$-halobutyronitrile, described in British Pat. No. 803,374 and by the hydrogenation of succinic acid or its anhydride in the presence of ammonia, described in French Pat. No. 1,338,138. N-allylpyrrolidone has been prepared by the carbonylation of diallylamine, also described in Belgian Pat. No. 660,797. The carbonylation of olefinic unsaturated primary and secondary amines is described in the aforementioned British patent and certain reactants and reaction conditions have been discussed, see Chem. Ber. 98, 1928–37 (1965) and Angewandte Chemie, Int. Ed., v. 5, No. 5, p. 438 (1966).

As the foregoing references indicate, it is known in the prior art to produce 2-pyrrolidone and N-substituted-2-pyrrolidones by carbonylation of allylamine and N-monosubstituted-allylamines. The production of allylamine from allyl chloride and ammonia and of N-substituted allylamines from allyl chloride and primary amines or from allylamine and alkyl chlorides is also known. The multiple step process for producing 2-pyrrolidone and N-substituted 2-pyrrolidones has certain inherent disadvantages. For example, there is considerable time consumption and significant labor costs in any multiple step process. More significantly, in the present case, however, are the lower yields available from the multiple step process, as compared with the novel one-step process described hereinafter, and the difficulties in separating certain of the intermediate products for further reaction. For example, while allylamine can be produced directly from allyl chloride and ammonia, the reaction product comprises an equilibrium mixture of N-mono-di- and tri-substituted allylamines. This reaction mixture must then be separated by distillation, etc. to produce a suitable reactant composition for the next step in the reaction sequence. Furthermore, while reaction conditions can be controlled to favor, to a limited extent, the production of a desired allylamine, any reaction mixture will include the mono and poly-substituted product. Consequently, the ultimate yield of the desired 2-pyrrolidone or N-substituted-2-pyrrolidone is comparatively low since a substantial portion of the original reactants must be dicarded before the final carbonylation step.

2-pyrrolidone and N-substituted pyrrolidones are known to be useful as cyclic monomers, see Hall, J. Am. Chem. Soc. 80, 6404–9 (1958); Champetier and Sekiguchi, Compt. rend, 249, 108–10 (1959); and Sekiguchi, Bull. Soc. chim. France, 1835–8 (1960), Nylon 4 (polypyrrolidone) production from 2-pyrrolidone has been studied by Masakuza Taniyama et al., Kogyo Kagaku 65, 415–26 (1960). The product of the present invention is a valuable monomer for the production of nylon-4 type polyamides. Nylons are useful for making fabrics, cordage, mono-filaments, coatings, moldings, machine parts and liquid products for use as lubricating oil modifiers.

Pyrrolidone is also useful as an intermediate in the production of polyvinyl pyrrolidone which has found application in medicine, cosmetics, textile finishes, and as a food stabilizer and thickener.

N-allyl-2-pyrrolidone is valuable for producing polymers which may be used as coatings, films, and machine parts.

While it is known that 2-pyrrolidone and N-substituted pyrrolidones are valuable intermediates in the production of many useful compositions and products, the synthesis of 2-pyrrolidones directly from allyl chloride by carbonylation in the presence of ammonia has not been recognized. Significantly, this one step synthesis process provides a direct and economical route for producing 2-pyrrolidones in significantly and unexpectedly higher yields than processes heretofore reported. Moreover, yields of 2-pyrrolidone and N-substituted-2-pyrrolidones can readily be controlled by the process of this invention. It is, therefore, a principal object of this invention to provide a new and improved process for producing 2-pyrrolidones and N-substituted-2-pyrrolidones in higher and controllable yields.

SUMMARY OF THE INVENTION

In general, the process of this invention contemplates the carbonylation of allyl chloride, preferably in a two-phase solvent system, in the presence of ammonia at elevated temperatures under greater than atmospheric pressures. The proportion of allyl chloride and ammonia and the temperature can be adjusted so as to produce 2-pyrrolidone and N-allyl-pyrrolidone simultaneously in equal proportions or to form 2-pyrrolidone predominantly or to form N-allyl-pyrrolidone predominantly, as desired. Similarly, C-substituted pyrrolidones and other N-substituted pyrrolidones may be produced by selection of the appropriate precursor, as will be described in detail hereafter. It is, therefore, an object of this invention to provide a new and improved method for the synthesis of 2-pyrrolidones and 2-pyrrolidone derivatives.

A further object of this invention is to provide a new and improved method for synthesizing N-allyl - 2 - pyrrolidone.

Still another object of this invention is to provide a method for simultaneously producing 2-pyrrolidone and N - allyl - 2 - pyrrolidone in controllable high yields by a single reaction using a two-phase solvent system.

Other objects of this invention will be apparent from the specification which follows.

Preferably, the reaction is carried out in an autoclave equipped with a stirring device. The autoclave is charged with allyl chloride (or the desired derivative thereof), benzene, ammonium hydroxide and catalyst. The autoclave is then pressured to greater than about 65 atmospheres with carbon monoxide and is heated for a period of from approximately 1 hour to approximately 6 hours at a temperature above 100° C., preferably in the range of 150 to 250° C.

Catalysts useful in this process are indium metal and salts or metals and compounds of metals selected from group VIII of the Periodic Table, preferably known carbonylation catalysts. For example, salts such as the halides, acetates, and nitrates, or carbonyls of cobalt, rhodium, nickel, palladium, iron, platinum, and indium may typically be used. Other salts and combinations of salts of these metals as well as the metals and combinations thereof may be used as well.

Compounds which may be used in the process of this invention are exemplified by the following formula:

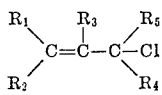

wherein $R_1$, $R_2$, $R_3$, $R_4$ and $R_5$ are hydrogen, alkyl, aryl or aralkyl, provided that either $R_1$ or $R_2$ and either $R_4$ or $R_5$ must be hydrogen or a $C_1$ to $C_3$ alkyl group and further provided that either $R_1$ or $R_2$ and either $R_4$ or $R_5$ must be hydrogen if the other of $R_1$ or $R_2$ or, respectively, $R_4$ or $R_5$ is more complex than a straight chain hydrocarbon radical having no more than three carbon atoms. Compounds of the above class are reacted with carbon monoxide and with either ammonia, (to produce 2-pyrrolidone or N-substituted pyrrolidones) or with a primary amine (to produce only N-substituted pyrrolidones) of the following class:

wherein $R_6$ may be alkyl, aryl or aralkyl.

Both $R_1$ and $R_2$ may be straight chain alkyl groups; however, if $R_1$ is not a normal alkyl group, i.e., there is branching, then $R_2$ must be hydrogen. Similarly, $R_1$ must be hydrogen if $R_2$ is a branched alkyl. For example, if $R_1$ is isobutyl, then $R_2$ must be hydrogen. $R_3$, $R_4$ and $R_5$, however, may be either straight chain or branched alkyl groups, aryl groups or aralkyl groups.

$R_6$ may be, for example, methyl, ethyl, isobutyl, octyl, dodecyl, or phenol and, when reacted according to the inventive process with carbon monoxide and allyl chloride, will produce N-methylpyrrolid-2-one, N-ethylpyrrolid-2-one, N-isobutylpyrrolid-2-one, N-octylpyrrolid-2-one, N-dodecylpyrrolid-2-one and N-phenylpyrrolid-2-one. Similarly, benzylamine in the present reaction results in N-benzylpyrrolid-2-one.

While $R_1$, $R_2$, $R_3$, $R_4$ and $R_5$ are limited to molecules having less than about 6–8 carbons, $R_6$ may be considerably larger and more complex, containing as many as 15 carbons.

While both lower and higher temperatures may be used in the reaction, the temperature range of from about 150° C. to about 250° C. is preferred. Temperatures in the range of from 100° C. to 350° C. are operative, however, under proper conditions of time and pressure.

Pressures in the range of about 2000 p.s.i.g. to 5000 are preferred but pressures as low as 1000 p.s.i.g. may be used, under proper conditions of temperature and time. Maximum useable pressure, under appropriate temperature and time conditions, may be from 5,000 to 10,000 p.s.i.g. being limited only by the strength of the autoclave.

While reaction times of less than 1 hour may be used, it has been found that for economical yield, reaction times of from 1 to 6 hours are preferable. Reduced yields may result from prolonged reaction times but the process is operative at times in excess of 6 hours.

The following examples are given to illustrate the preferred embodiment of the novel process of this invention and are not intended to be limiting. Reactants and reaction conditions in the following examples are selected to illustrate the reaction condition variables.

A series of runs were made using, as the reactants, allyl chloride, carbon monoxide, and ammonia. Allyl chloride (0.5 m.), a solvent system (75–200 ml.) of either 28% ammonium hydroxide, benzene, or ammonium hydroxide and benzene and the catalyst were placed in an autoclave. The autoclave was heated to the desired reaction temperature and pressurized with carbon monoxide at the desired pressure. At the end of the reaction time (3 hours in this series of runs) the autoclave was cooled and the products were analyzed by gas chromatography. The essential reaction conditions and results of this series of runs are shown in Table I.

TABLE I.—ONE STEP PROCESS FOR PRODUCING 2-PYRROLIDONES

| Run Number | Solvent system (volume ratio) | Catalyst system | Temp., °C. | $NH_3$ (moles) | $C_3H_5Cl$ (moles) | CO (p.s.i.g.) | 2-pyrrolidone | N-allyl-pyrrolid-2-one |
|---|---|---|---|---|---|---|---|---|
| 1 | Benzene, 100% | Co(OAc)$_2$ a | 250 | 1.5 | 0.75 | 3,600 | b 7 | b 4 |
| 2 | Benzene, 100% | Co(OAc)$_2$ | 250 | 1.5 | 0.75 | 3,600 | c 6 | c 4 |
| 3 | H$_2$O, 100% | CoCl$_2$ | 250 | 1.5 | 0.75 | 3,600 | (d) | (d) |
| 4 | 1 benzene:1 H$_2$O | CoCl$_2$—$\phi_3$P e | 250 | 1.5 | 0.75 | 2,200 | 50 | 10 |
| 5 | do | CoCl$_2$—$\phi_3$P | 250 | 1.5 | 0.75 | 2,300 | 30 | 6 |
| 6 | 3 benzene:5 H$_2$O | CoCl$_2$—$\phi_3$P | 250 | 1.5 | 0.75 | 3,600 | f 32 | g 40 |
| 7 | 3 benzene:4 H$_2$O | Co(CO)$_8$ | 250 | 1.2 | 0.5 | 1,750 | 12 | 32 |
| 8 | do | Co(CO)$_8$ | 250 | 1.2 | 0.5 | 3,450 | 50 | 9.6 |
| 9 | do | Co(CO)$_8$ | 250 | 1.5 | 0.38 | 3,950 | 32 | 23 |
| 10 | do | Co(CO)$_8$ | 260 | 1.5 | 0.75 | 3,820 | 25 | 35 |
| 11 | do | Co$_2$(CO)$_8$+CoCl$_2$ | 160 | 1.5 | 0.75 | 2,200 | 7 | 51 |
| 12 | do | CoCl$_2$ | 160 | 1.5 | 0.75 | 3,200 | 8.2 | 50 |
| 13 | do | RhCl$_2$ | 250 | 1.2 | 0.5 | 3,050 | 40 | 22 | a Cobalt acetate.  b Polymer formation 75%.  c Polymer formation 80%.  d Polymer formation 100%.  e Triphenylphosphine.  f Average of three runs (32) (32) (33).  g Average of three runs (38) (40) (42).

DISCUSSION

Two unexpected improvements in yield using the improved one-step of this invention will be apparent from a careful study of the data in Table 1.

First, it will be seen that using a single phase solvent system, either aqueous or non-aqueous, yields of 2-pyrrolidone and N-allylpyrrolid-2-one were quite low while polymer formation was very high. Using benzene, for example, 75 to 80 percent of the reactants formed an unrecoverable polymer. All of the reactants, using an aqueous solvent system, formed an unrecoverable polymer, apparently of the same type.

Significant polymer formation, however, was avoided in most cases using the two-phase solvent system of this invention. It was found, however, that substantial polymer formation occurred when the molar ratio of allyl chloride to ammonia was 2:1, e.g., 0.38 mole of ammonia and 0.75 mole of allyl chloride.

Secondly, the yield of both 2-pyrrolidone and N-allylpyrrolid-2-one is substantially greater using the improved one step, two-phase, process of this invention as compared with the process of the prior art. It will be noted, for example, that the total yield was on the order of about 10 percent using benzene as a single phase solvent and even poorer using an aqueous solvent. The best results recorded previously for the multiple step process using refined reaction and separation techniques is 54 percent. In contrast, combined yields of about 70 percent or greater can be obtained using the one step, two-phase, process of this invention.

Furthermore, by appropriate selection of the molar ratio of the reactants and the operating temperature and pressure, the formation of 2-pyrrolidone or, respectively, N-allylpyrrolid-2-one may be favored. Low temperatures, for example, favor the production of N-allylpyrrolid-2-one.

The improved yields are partially attributable, it is believed, to the use of a heterogeneous solvent system of benzene and water which allows the reaction, allyl chloride and ammonia, to occur only at the interface. The product is extracted from the equilibrium condition substantially instantly into the aqueous phase as it is formed. Formation of polymers and degradation products is, thereby, limited.

The benzene-water solvent system has been found effective; however, it will be understood that since these components do not enter into the reaction any aqueous-non-aqueous solvent system which is inert to the reactant may be used. For example, substituted benzenes, and saturated or partially saturated cyclic compounds may also be used with water to form the desired heterogeneous solvent system.

Other modifications may be made of the process as described hereinbefore without departing from the spirit and scope of the invention as defined in the following claims:

I claim:

1. A process for providing compounds selected from the group consisting of 2-pyrrolidone and N-allyl pyrrolidone and mixtures thereof comprising reacting in a single step allyl chloride with ammonia in a two-phase aqueous-aromatic solvent system under greater than about 50 atmospheres pressure of carbon monoxide at temperatures from about 100° C. to about 350° C. in the presence of a carbonylation catalyst which is a metal or salt of a metal selected from the group consisting of indium, iron, cobalt, nickel, ruthenium, rhodium, palladium, osmium, iridium and platinum.

2. A process for producing 2-pyrrolidones comprising reacting in a single step allyl chloride with ammonia in an aqueous-aromatic solvent system under a pressure of from about 2000 p.s.i.g. to about 4000 p.s.i.g. of carbon monoxide at a temperature of from about 150°C. to about 250° C. in the presence of a metal or a salt of a metal selected from the group consisting of indium, iron, cobalt, nickel, ruthenium, rhodium, palladium, osmium, iridium and platinum.

3. The improved process of claim 1 wherein the pressure is between about 2000 p.s.i.g. and about 400 p.s.i.g.

4. The improved process of claim 1 wherein the reaction temperature is from about 150° C. to about 300° C.

5. The process of claim 1 wherein the contact time is from about 1 hour to about 6 hours.

6. A process of claim 2 wherein said aqueous aromatic solvent system is a water-benzene solvent system.

References Cited

FOREIGN PATENTS 1,027,949    5/1966    Great Britain _____ 260—326.5

OTHER REFERENCES

Ploetz: Chem. Abs., vol. 54–2846 (1960).

ALEX MAZEL, Primary Examiner

J. A. NARCAVAGE, Assistant Examiner

PO-1050
(5/69)

UNITED STATES PATENT OFFICE
CERTIFICATE OF CORRECTION

Patent No. 3,637,743　　　　Dated January 25, 1972

Inventor(s)　Frank R. Prince

It is certified that error appears in the above-identified patent and that said Letters Patent are hereby corrected as shown below:

IN THE CLAIMS

Claim 1, line 1 "providing" should read "producing".

Please add the following claim which has been omitted:

Signed and sealed this 29th day of August 1972.

(SEAL)
Attest:

EDWARD M. FLETCHER, JR.　　　　ROBERT GOTTSCHALK
Attesting Officer　　　　Commissioner of Patents